Figure 6:
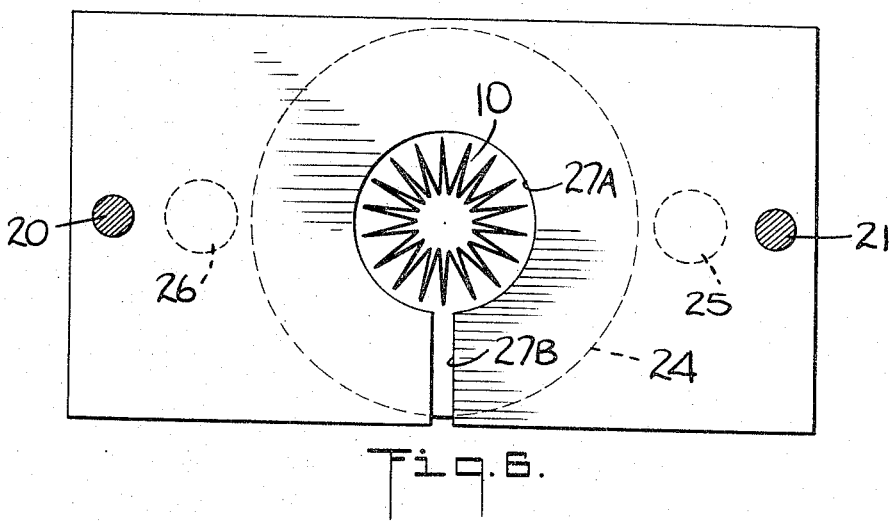

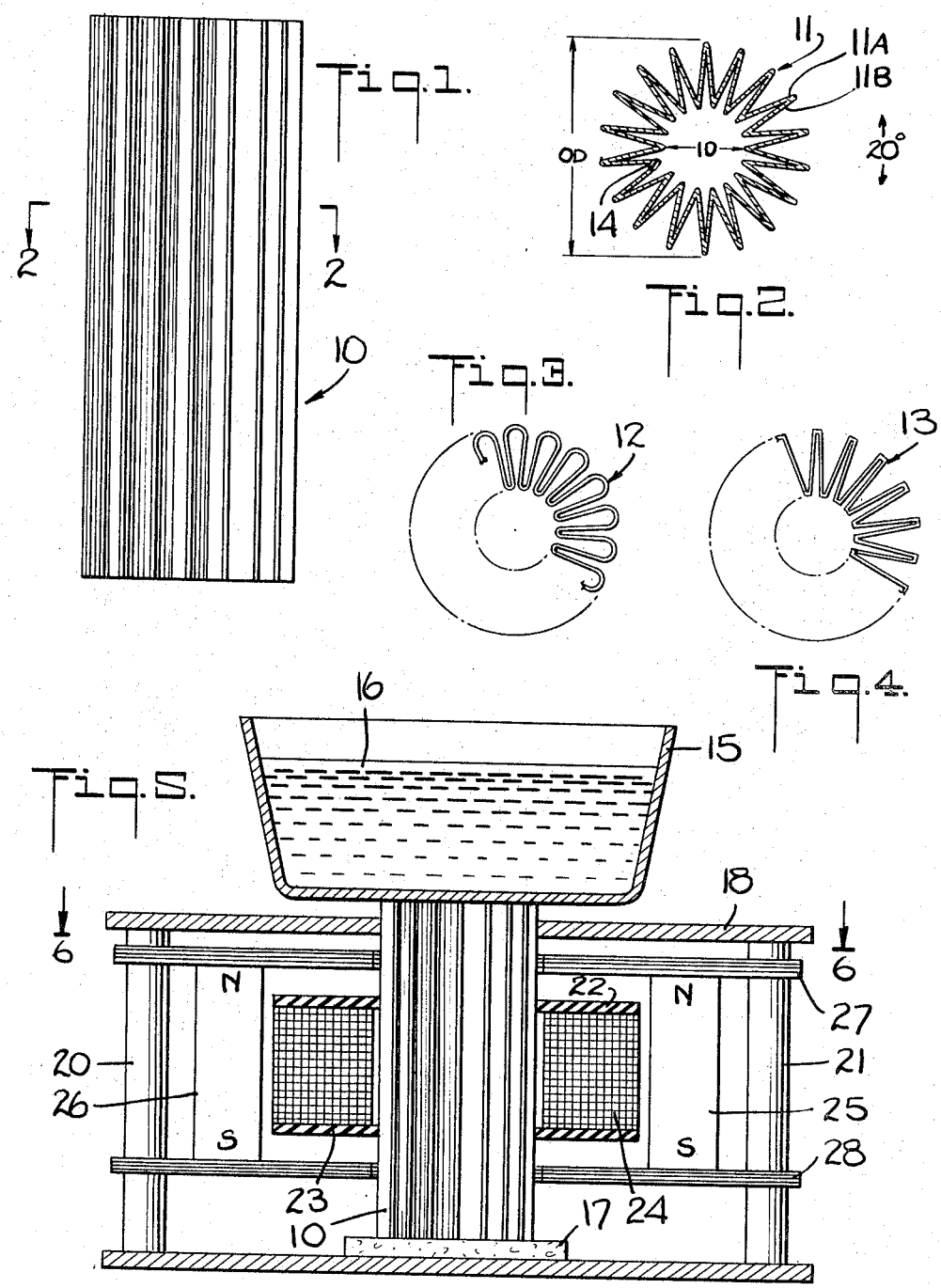

March 28, 1967   F. DOSTAL   3,311,352
MAGNETOSTRICTIVE TRANSDUCERS
Filed March 25, 1965   2 Sheets-Sheet 2

INVENTOR.
FRANK DOSTAL
BY
ATTORNEY

United States Patent Office 3,311,352
Patented Mar. 28, 1967

3,311,352
MAGNETOSTRICTIVE TRANSDUCERS
Frank Dostal, Elmhurst, N.Y., assignor to Bulova Watch Company, Inc., New York, N.Y., a corporation of New York
Filed Mar. 25, 1965, Ser. No. 442,734
9 Claims. (Cl. 259—72)

This invention relates generally to magnetsostrictive transducers for generating ultrasonic waves, and more particularly to an improved core for such transducers.

Magnestostrictive transducers adapted to generate ultrasonic waves are constituted by a rod or core of magnetostrictive material surrounded by a coil, the core being subjected to a constant magnetic field. In operation, periodic voltages are impressed on the coil, causing the core to vibrate longitudinally at its resonant frequency, thereby producing ultrasonic energy at high amplitude levels.

Such ultrasonic generators have many practical applications, as for example, in the non-destructive testing of materials, as diagnostic and therapeutic medical instruments, in the soldering of materials without fluxes, and in industrial and dental drilling. While the present invention will be illustrated in the context of cleaning operations in which the transducer is coupled to a fluid medium, it is to be understood that the invention has many other applications in the ultrasonic field.

In its simplest embodiment, the magnetostrictive core, which is the heart of the transducer, usually takes the form of a solid or hollow rod. One of the limiting factors in magnetostrictive cores is the presence of eddy currents which become greater with frequency. Such currents give rise to power losses due to $I^2R$ effects. Moreover, the interior of the core is shielded from the field produced by the surrounding coil, hence the interior does not contribute to the magnetostriction output. While the hollow core rather than the solid rod overcomes this drawback, the cross-sectional area of the tubular wall of this core is relatively small, with a resultant loss in power.

In order to minimize hysteresis and eddy current losses and to improve the overall efficiency of the transducer, it is known to make the core in the form of a laminated hollow cylinder defined by individual rectangular strips which are arranged radially and are secured together. While such laminated cores provide increased transducer efficiency, they are difficult to assemble and relatively expensive to manufacture.

Accordingly, it is the major object of this invention to provide an improved, low-cost core for a magnetostrictive transducer, which core minimizes hystersis and eddy current effects and yet is relatively simple to manufacture.

More specifically, it is an object of the invention to provide a core having the desired characteristics, which core is fabricated from a single sheet of magnetostrictive metal, the sheet being pleated to define interconnected strips and being bent to form a hollow cylinder.

Also an object of the invention is to provide highly efficient ultrasonic generators incorporating a core of the above-described type.

Briefly stated, these objects are accomplished in a transducer constituted by a sheet of magnetostrictive material which is corrugated to form a series of parallel pleats, the sheet being bent to arrange said pleats circumferentially into a cylindrical core in which the terminal pleats are insulated from each other, the core being surrounded by a coil and being subjected to a uniform magnetic field.

Figure 7:
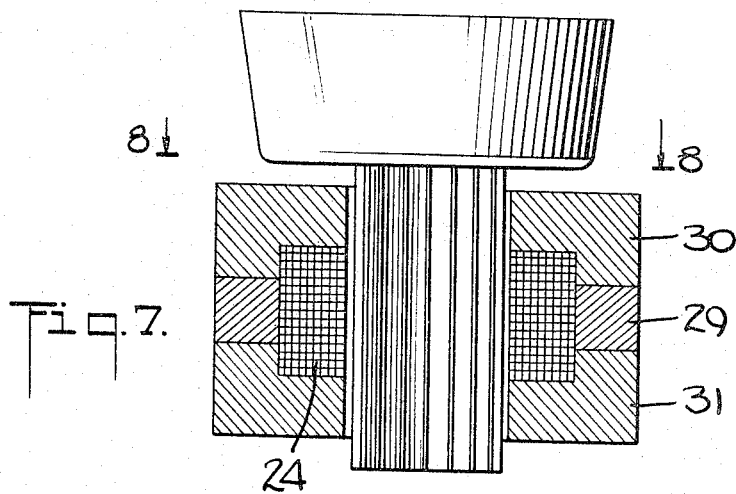
Figure 8:
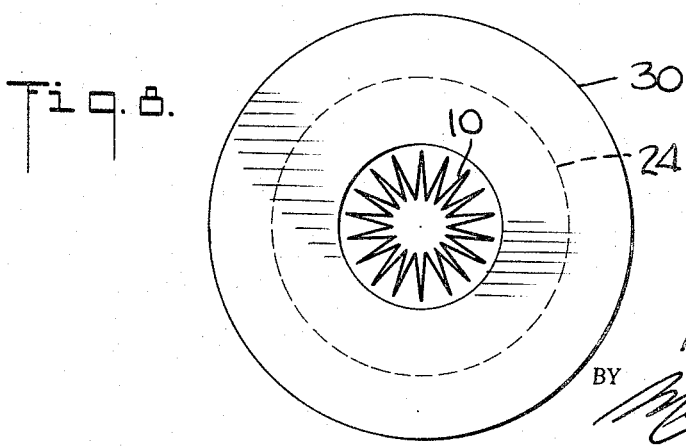

For a better understanding of the invention as well as other objects and further features thereof, reference is made to the following detailed description to be read in conjunction with the accompanying drawing, wherein:

FIG. 1 is an elevational view of a pleated magnetostrictive core in accordance with the invention;
FIG. 2 is a transverse section taken along line 2—2 in FIG. 1;
FIG. 3 illustrates in plan view a modified form of core configuration;
FIG. 4 shows in plan view another modification of the core configuration;
FIG. 5 is a vertical section taken through an ultrasonic cleaner in accordance with the invention;
FIG. 6 is a transverse section taken in the plane indicated by line 6—6 in FIG. 5;
FIG. 7 is a vertical section taken through another embodiment of a cleaner in accordance with the invention; and
FIG. 8 is a transverse section taken in the plane indicated by line 8—8 in FIG. 7.

Referring now to the drawings, and in particular to FIGS. 1 and 2, there is shown a magnetostrictive core in accordance with the invention, the core being generally designated by numeral 10. The core is fabricated from a single rectangular sheet of magnetostrictive metal, such as high-purity nickel (Grade A). In practice, any suitable metal having magnetostrictive characteristics may be used, such as stoic metal (nickel 36%—iron 64%), Monel metal (nickel 68%—copper 28%), or permalloy.

The sheet is corrugated by any known metal-working technique to define a uniform series of triangular pleats 11, each pleat being formed by two interconnected rectangular strips 11A and 11B which are mutually inclined. The pleated sheet is curved into a hollow cylinder whose outer diameter OD intersects the apexes of the triangular pleat 11, and whose inner diameter ID intersects the junctions of the series of pleats. In one practical embodiment, the core was constructed of pure nickel having a thickness of .012", the sheet being corrugated with eighteen pleats and being curved to produce a core having a height of 2.75", and OD of .75" and an inner diameter of 5/16 of an inch.

The strips 11A and 11B of each pleat 11 are angularly disposed with respect to the radial plane R of the core. This plane extends through the apex of the pleat, hence the strips 11A and 11B are non-radially arranged. In the embodiment described above, the angle between adjacent apexes of the pleats is 20° and 10° from a pleat side to the radius.

While the triangular pleats 11 are shown as having relatively sharp apexes and sharp angles at the junction points, the corrugations of the metal sheet may be such, as shown in FIG. 3, as to produce pleats 12 having a rounded formation at the apex and at the junctions. Alternatively, the sheet may be corrugated to form apexes and junctions, as shown in FIG. 4, wherein the pleats 13 have a squared-off configuration.

In all forms of this core, shown in FIGS. 1 to 4, the terminal pleats which are juxtaposed when bending the pleated sheet into cylindrical form, are not interconnected, but are maintained electrically insulated from each other. This is necessary to avoid short-circuited turns with respect to eddy currents induced in the core. In practice, as shown in FIG. 2, the edges of the terminal pleats may be joined together with a dielectric bead 14, which serves to maintain the cylindrical form without short-circuiting the core. The core may be considered to be constituted by a vertical stack of open-circuited single turns, each having the configuration shown in FIG. 2. In addition, a thin insulating oxide layer can be formed on the metal surface prior to forming in order to guard against shorted turn effects.

The pleat arrangements shown in FIGS. 1 to 4 provide a greater magnetostrictive mass than a simple hollow cylinder, thus ensuring a greater factor of safety for operating the transducer a higher power levels. At the same time, the increased surface area provided by the pleated construction results in better heat dissipation.

Referring now to FIGS. 5 and 6, there is shown an ultrasonic cleaner in accordance with the invention, having a transducer in accordance with the invention, including a pleated core 10. The cleaner, which may be used to remove contaminants from small articles of jewelry, dental plates, and the like, is provided with a bowl 15 containing a fluid 16. The bottom of bowl 15 is brazed or welded to the upper end of the vertically mounted core 10. The lower end of the core rests on a suitable platform 17 of a cushioning material such as cork. The cleansing action results from the effect of cavitation or fluid acceleration produced by the high-frequency vibrations or compressional waves transmitted to the bath by operation of the transducer. The liquid in which cavitation takes places may be a solvent for the contaminant in question, or it may be a suitable detergent, plain water, or any other appropriate fluid.

The coil and magnetic elements of the transducer are supported by means of a frame having a top panel 18, a base panel 19, and vertical posts 20 and 21 interconnecting the panels. Supported between two horizontal insulating plates 22 and 23 extending between the posts, is a coil 24. Coil 24 surrounds core 10 and is positioned centrally thereon. Coil 24 is connected in the circuit of an appropriate oscillating or driven amplifier of conventional design for producing magnetostrictive vibrations in core 10.

The core is polarized by means of a pair of permanent magnet rods 25 and 26 vertically mounted on opposite sides of the coil, the upper ends of the magnet rods, which are of like polarity (i.e., north), engaging a laminated pole piece 27, and the lower ends of the magnet rods, which are of the same polarity but opposed to that of the upper ends (i.e., south), engaging a laminated pole piece 28.

The laminated pole pieces, as shown separately in FIG. 6, may be made of soft steel or other highly permeable material, the pieces having a rectangular form with a circular opening 27A to accommodate the core 10, and a slot 27B communicating between the opening and the edge to minimize shorted turn effects in the pole piece. Thus the core in the region between the upper and lower pole pieces is subjected to a uniform magnetic polarizing field, and the core in the same region is further subjected to the pulsating electromagnetic field produced by the coil.

In the embodiment shown in FIGS. 7 and 8, the transducer arrangement is essentially the same as that in FIGS. 5 and 6, except that the polarizing field is produced by a permanent ring magnet 29 which surrounds the coil 24, the upper face of the magnet engaging pole piece ring 30 and the lower face, a pole piece ring 31. The rings are formed of a suitable powder, such as soft iron or a ferrite compound which is molded by well-known powder metallurgy techniques, into the desired form.

While there have been shown several preferred embodiments of magnetostrictive transducers in accordance with the invention, it will be appreciated that many changes and modifications may be made therein without, however, departing from the essential spirit of the invention as defined in the annexed claims.

What I claim is:

1. In a magnetstrictive transducer, a core fabricated of a sheet of magnetostrictive material corrugated into a series of parallel pleats, the sheet being curved to arrange said pleats circumferentially into a hollow cylinder, the end pleats in said cylinder being insulated from each other to prevent short-circuiting the core with respect to eddy currents induced therein.

2. A transducer as set forth in claim 1, wherein said core is formed of pure nickel sheeting.

3. A transducer as set forth in claim 1, wherein said pleats have a triangular configuration with relatively sharp angles.

4. A transducer as set forth in claim 1, wherein said pleats have a rounded configuration.

5. A transducer as set forth in claim 1, wherein said pleats have a squared-off configuration.

6. A magnetostrictive transducer comprising:
 (A) a core fabricated of a sheet of magnetostrictive material corrugated into a series of parallel pleats, said pleats being circumferentially arranged to define a hollow cylinder, the end pleats in said cylinder being insulated from each other,
 (B) a coil surrounding said core, and
 (C) means to polarize said core including pole pieces disposed above and below said coil in operative association with said core, and a permanent magnet whose poles engage said pole pieces.

7. A transducer as set forth in claim 6, wherein said pole pieces are constituted by laminated material.

8. A transducer as set forth in claim 6, wherein said pole pieces are constituted by sintered powdered metal bodies in ring form surrounding said core, and said permanent magnet is in ring form sandwiched between said pole pieces.

9. A cleaner comprising a transducer as set forth in claim 6 including a fluid bowl secured to one end of said core.

References Cited by the Examiner
UNITED STATES PATENTS

| | | | |
|---|---|---|---|
| 2,452,531 | 10/1948 | Snoek | 310—26 XR |
| 2,826,396 | 3/1958 | Murdoch. | |
| 2,874,316 | 2/1959 | Murdoch. | |
| 3,016,498 | 1/1962 | Powell | 310—26 XR |

WALTER A. SCHEEL, *Primary Examiner.*

J. M. BELL, *Assistant Examiner.*